United States Patent
Hsiang

(10) Patent No.: US 10,554,974 B2
(45) Date of Patent: Feb. 4, 2020

(54) METHOD AND APPARATUS ENABLING ADAPTIVE MULTIPLE TRANSFORM FOR CHROMA TRANSPORT BLOCKS USING CONTROL FLAGS

(71) Applicant: MEDIATEK INC., Hsin-Chu (TW)

(72) Inventor: Shih-Ta Hsiang, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/843,141

(22) Filed: Dec. 15, 2017

(65) Prior Publication Data
US 2018/0205949 A1   Jul. 19, 2018

Related U.S. Application Data

(60) Provisional application No. 62/445,829, filed on Jan. 13, 2017.

(51) Int. Cl.
| | |
|---|---|
| *H04N 19/12* | (2014.01) |
| *H04N 19/157* | (2014.01) |
| *H04N 19/186* | (2014.01) |

(52) U.S. Cl.
CPC ........... *H04N 19/12* (2014.11); *H04N 19/157* (2014.11); *H04N 19/186* (2014.11)

(58) Field of Classification Search
CPC ..... H04N 19/12; H04N 19/157; H04N 19/186
See application file for complete search history.

(56) References Cited

U.S. PATENT DOCUMENTS

| | | | |
|---|---|---|---|
| 2017/0150186 A1* | 5/2017 | Zhang | H04N 19/119 |
| 2017/0272759 A1* | 9/2017 | Seregin | H04N 19/11 |
| 2018/0020218 A1* | 1/2018 | Zhao | H04N 19/103 |
| 2018/0048889 A1* | 2/2018 | Zhang | H04N 19/11 |

(Continued)

FOREIGN PATENT DOCUMENTS

EP    3457691 A4 *   3/2019   ........... H04N 19/159

OTHER PUBLICATIONS

Zhao et al, "Enhanced Multiple Transform for Video Coding." 2016. 2016 Data Compression Conference (DCC), Data Compression Conference (DCC), 2016, Data Compression Conference, 2016, 73. doi:10.1109/DCC.2016.9 (Year: 2016).*

(Continued)

*Primary Examiner* — Jamie J Atala
*Assistant Examiner* — Michael Robert Cammarata
(74) *Attorney, Agent, or Firm* — McClure, Qualey & Rodack, LLP

(57) ABSTRACT

Methods and apparatus for coding system incorporating AMT (adaptive multiple core transform) for the chroma transform blocks (TBs) are disclosed. According to one method, one or more flags are signaled to indicate whether AMT can be applied for the chroma TBs. If the one or more flags indicate that AMT can be applied for the chroma TBs, the chroma TBs can use the same or separate AMT selection information as the corresponding Luma TB. According to another method, when AMT and the transform skip mode are both available for use for a transform block, the on/off signaling of AMT is coded before the on/off signaling of the transform skip mode. The on/off signaling of the transform skip mode is not coded if the coded AMT on/off flag is true. The on/off signaling of the transform skip mode can be inferred to be false if not coded.

17 Claims, 2 Drawing Sheets

(56) References Cited

U.S. PATENT DOCUMENTS

| | | | |
|---|---|---|---|
| 2018/0063553 A1* | 3/2018 | Zhang | H04N 19/46 |
| 2018/0098081 A1* | 4/2018 | Zhao | H04N 19/136 |
| 2018/0205946 A1* | 7/2018 | Zhang | H04N 19/11 |
| 2019/0149822 A1* | 5/2019 | Kim | H04N 19/176 |
| 2019/0158829 A1* | 5/2019 | Ohkawa | H04N 19/122 |

OTHER PUBLICATIONS

Biatek, T., et al.; "Low-Complexity Adaptive Multiple Transforms for post-HEVC video coding;" IEEE; 2016; pp. 1-5.
Choi, K., et al.; "Adaptive Multiple Transform for Chroma;" Joint Video Exploration Team (JVET) of ITU-T SG 16 WP 3 and ISO/IEC JTC 1/SC 29/WG 11; Feb. 2016; pp. 1-6.

* cited by examiner

METHOD AND APPARATUS ENABLING ADAPTIVE MULTIPLE TRANSFORM FOR CHROMA TRANSPORT BLOCKS USING CONTROL FLAGS

CROSS REFERENCE TO RELATED APPLICATIONS

The present invention claims priority to U.S. Provisional Patent Application, Ser. No. 62/445,829, filed on Jan. 13, 2017. The U.S. Provisional Patent Application is hereby incorporated by reference in its entirety.

FIELD OF THE INVENTION

The present invention relates to transform coding in video coding. In particular, the present invention discloses a coding method using adaptive multiple core transform (AMT) with separate signaling for the chroma transform blocks (TBs).

BACKGROUND AND RELATED ART

High-efficiency video coding (HEVC) is the latest video coding standard developed by the Joint Collaborative Team on Video Coding (JCT-VC). In HEVC, a coded picture is represented by a plurality of coded slices. Each slice is partitioned into multiple coding tree units (CTUs). In the main profile, the minimum and the maximum sizes of CTU are specified by the syntax elements in the sequence parameter set (SPS), where the CTU size can be 8×8, 16×16, 32×32, or 64×64. Inside a slice, a raster scan method is used for processing the CTU accordingly. The CTU is further partitioned into multiple coding units (CUs) to adapt to various local characteristics. Each CU can be further divided into one or more non-overlapped prediction units (PUs). The PU works as a basic operation unit for predicting sample values in a block region. After obtaining the residual block by the prediction process, a CU can be partitioned into transform units (TUs). The TU is a basic block for applying transform and quantization operation for representing the prediction residual signal from a block region. A TU can consist of multiple transform blocks (TBs) corresponding to different color components from the same block region.

Joint Video Exploration Team (JVET) of ITU-T SG 16 WP 3 and ISO/IEC JTC 1/SC 29/WG 11 are currently developing the next-generation international video coding standard. In Joint Exploration Test Model 4 (JEM4) as specified in JVET-D1001 (J. Chen, et al, "*Algorithm Description of Joint Exploration Test Model 4*," Joint Video Exploration Team of ITU-T SG16 WP3 and ISO/IEC JTC1/SC29/WG11, JVET-D1001, 4th Meeting: Chengdu, C N, 15-21 Oct. 2016), Adaptive Multiple core Transform (AMT) is adopted for providing additional transform types for coding residual blocks. For HEVC, the DCT-2 (Discrete Cosine Transform-2) transform type is used. In JVET-D1001, additional transform types including DCT-8 and DST-7 (Discrete Sine Transform-7) are also supported. The additional transform set can only be applied to luma transform blocks. When the luma TB is signaled to be non-zero, an on/off control flag (i.e., emt_cu_flag) is further signaled to indicate whether AMT is applied to the luma TBs in the current CU. When emt_cu_flag is equal to 1, the selected transform index information is further coded. According to JVET-D1001, AMT is not applied to the chroma TBs and DCT-2 is always used by the chroma TBs.

In JVET-E0036 (T. Tsukuba, et al, "On Adaptive Multiple Core Transform for Chroma," Joint Video Exploration Team of ITU-T SG16 WP3 and ISO/IEC JTC1/SC29/WG11, JVET-E0036, 5th Meeting: Geneva, CH, 12-20 Jan. 2017), AMT is also applied to chroma TBs. However, there is no separate signaling for the chroma TBs. Therefore, the signaled AMT operation for the luma TBs is also applied to the chroma TBs from the same TU. The AMT for chroma TBs based on JVET-E0036 has shown some coding performance improvement.

It is desirable to further improve the coding performance of AMT on the chroma TBs. Accordingly, various AMT signaling methods for the chroma TBs are disclosed.

BRIEF SUMMARY OF THE INVENTION

A method and apparatus for video coding using block partition are disclosed. According to the present invention, input data associated with a current control unit in a current picture are received, where the current control unit comprises one luma component and two chroma components. One or more luma AMT (adaptive multiple core transform) control flags for a current luma TB (transform block) in the current control unit are determined. A first transform is then applied to the current luma TB according to luma AMT selection information as indicated by said one or more luma AMT control flags. One or more first chroma AMT control flags are determined for two current chroma TBs (transform blocks) corresponding to the current luma TB in the current control unit, where said one or more first chroma AMT control flags indicate whether chroma AMT is enabled for said two current chroma TBs. If said one or more first chroma AMT control flags indicate the chroma AMT being disabled for said two current chroma TBs, applying a fixed-type transform to said two current chroma TBs. A fixed-type transform is applied to said two current chroma TBs if said one or more first chroma AMT control flags indicate the chroma AMT being disabled for said two current chroma TBs.

The method may further comprise further determining a chroma AMT on/off flag to indicate whether the chroma AMT is applied to said two current chroma TBs if said one or more first chroma AMT control flags indicate the chroma AMT being enabled for said two current chroma TBs. In this case, the method may further comprise applying the chroma AMT to said two current chroma TBs using at least a part of the luma AMT selection information if the chroma AMT on/off flag indicates that the chroma AMT is applied to said two current chroma TBs. Alternatively, the method may further comprise applying the chroma AMT to said two current chroma TBs using at least a part of pre-defined chroma AMT selection information if the chroma AMT on/off flag indicates that the chroma AMT is applied to said two current chroma TBs and block size of said two current chroma TBs is smaller than a threshold value.

Said one or more first chroma AMT control flags can be located in SPS (sequence flag set), PPS (picture flag set), slice head, CTU (coding tree unit), CU (coding unit) or a combination thereof of a video bitstream.

The method my also comprise determining one or more second chroma AMT control flags for said two current chroma TBs if said one or more first chroma AMT control flags indicate the chroma AMT being enabled for said two current chroma TBs, where said one or more second chroma AMT control flags indicate whether said applying the chroma AMT to said two current chroma TBs uses separate chroma AMT selection information or share the luma AMT selection information with the current luma TB. In this case, the method may further comprise determining at least a part of said separate chroma AMT selection information if said one or more second chroma AMT control flags indicate that said applying the chroma AMT to said two current chroma TBs uses separate chroma AMT selection information. Said at least a part of said separate chroma AMT selection information can be predicted or derived from said luma AMT selection information associated with the current luma TB in the current picture or a neighboring picture. Said one or more second chroma AMT control flags can be located in SPS (sequence flag set), PPS (picture flag set), slice head, CTU (coding tree unit), CU (coding unit) or a combination thereof of a video bitstream.

Aspects of the disclosure further provide a non-transitory computer readable medium storing program instructions causing a processing circuit of an apparatus to perform the video coding method mentioned above. Accordingly, the program instructions will cause the processing circuit of the apparatus to receive input data associated with a current control unit in a current picture, where the current control unit comprises one luma component and at least two chroma components; determine one or more luma AMT (adaptive multiple core transform) control flags for a current luma TB (transform block) in the current control unit; apply a first transform to the current luma TB according to luma AMT selection information as indicated by said one or more luma AMT control flags; determine one or more first chroma AMT control flags for two current chroma TBs (transform blocks); and apply a fixed-type transform to said two current chroma TBs if said one or more first chroma AMT control flags indicate the chroma AMT being disabled for said two current chroma TBs corresponding to the current luma TB in the current control unit, wherein said one or more first chroma AMT control flags indicate whether chroma AMT is enabled for said two current chroma TBs.

According to another method, input data associated with a current control unit in a current picture are received. One or more AMT on/off flags are signaled at an encoder side or parsed at a decoder side for a current TB in a current control unit, where said one or more AMT on/off flags indicate whether AMT is applied to the current TB. One or more transform skip flags are signaled at the encoder side or parsed at the decoder side for the current TB depending on said one or more AMT on/off flags for the current TB, where said one or more transform skip flags are signaled at the encoder side or parsed at the decoder side after said one or more AMT on/off flags are signaled at the encoder side or parsed at the decoder side for the current TB, and said one or more transform skip flags indicate whether the transform skip mode is applied to the current TB. In one embodiment, said one or more transform skip flags are not signaled if said one or more AMT on/off flags indicate AMT is applied to the current TB. In another embodiment, if said one or more transform skip flags are not present in a video bitstream, the transform skip mode is not applied to the current TB.

Aspects of the disclosure further provide a non-transitory computer readable medium storing program instructions causing a processing circuit of an apparatus to perform the video coding method mentioned above. Accordingly, the program instructions will cause the processing circuit of the apparatus to receive input data associated with a current control unit in a current picture; signal, at an encoder side, or parsing, at a decoder side, one or more AMT on/off flags for a current TB in a current control unit, wherein said one or more AMT on/off flags indicate whether AMT is applied to the current TB; and signal, at the encoder side, or parsing, at the decoder side, one or more transform skip flags for the current TB depending on said one or more AMT on/off flags for the current TB, where said signaling, at the encoder side, or said parsing, at the decoder side, one or more transform skip flags for the current TB is performed after said signaling, at the encoder side, or said parsing, at the decoder side, said one or more AMT on/off flags for the current TB, and said one or more transform skip flags indicate whether the transform skip mode is applied to the current TB.

DETAILED DESCRIPTION OF THE INVENTION

Figure 1:
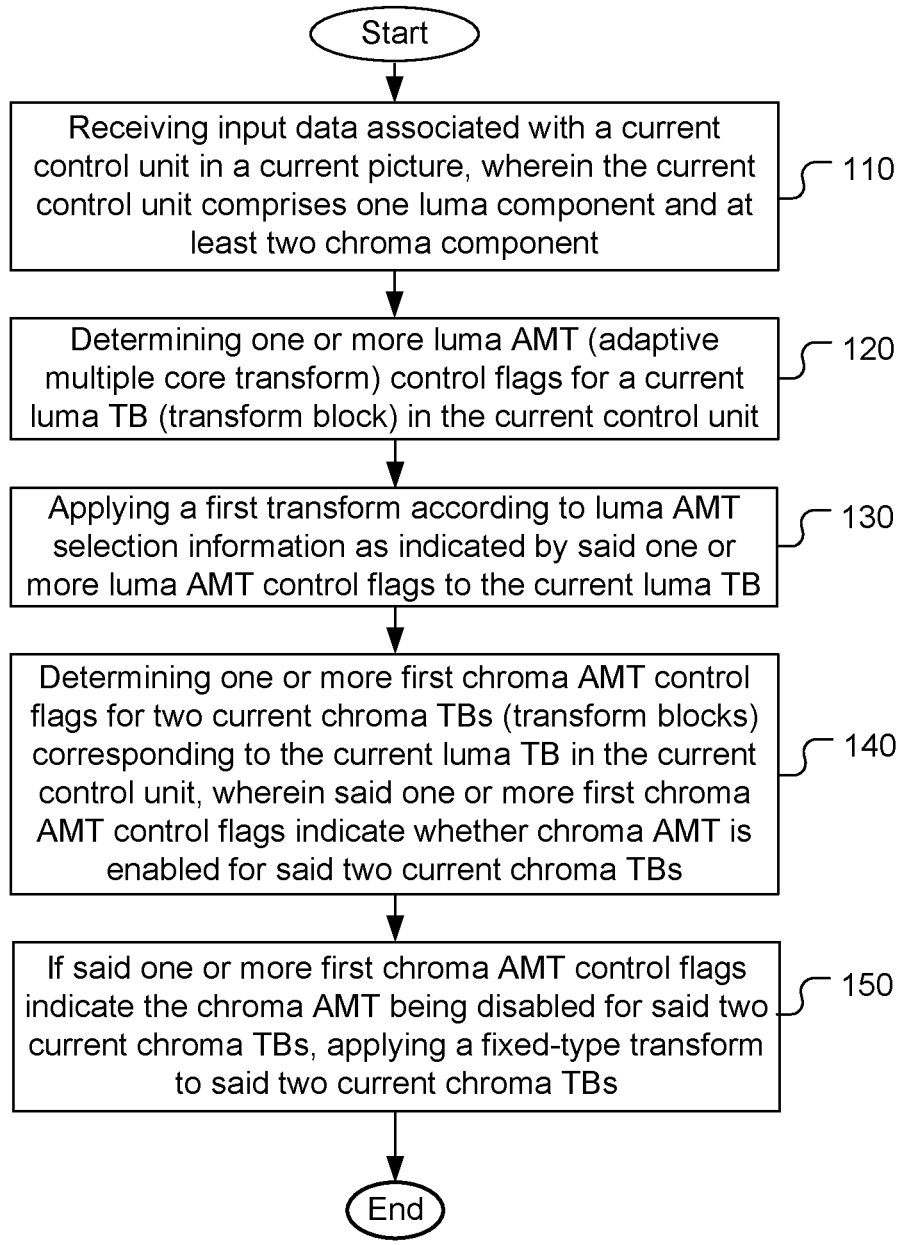
FIG. 1 illustrates a flowchart of an exemplary coding system incorporating an embodiment of the present invention, where the use of AMT (adaptive multiple core transform) for the chroma transform blocks (TBs) is signaled.

The following description is of the best-contemplated mode of carrying out the invention. This description is made for the purpose of illustrating the general principles of the invention and should not be taken in a limiting sense. The scope of the invention is best determined by reference to the appended claims.

In the present invention, methods to further improve coding efficiency of Adaptive Multiple core Transform (AMT) are disclosed. In one method, when AMT is enabled, a control flag, emt_cr_enabled_flag, is coded to indicate whether AMT can be applied to the transform blocks corresponding to the two chroma components within the current control unit, where the term "control unit" is used to indicate that the present invention is applicable to a processing unit beyond the coding unit (CU), prediction unit (PU) and transform unit (TU). When AMT is enabled and emt_cr_enabled_flag is equal to 1, then AMT can be applied to the chroma transform blocks in the current control unit. Otherwise, AMT cannot be applied to the chroma transform blocks. In this way, we can choose to enable or disable AMT for the chroma transform blocks separately from the luma blocks. The control flag can be present in the SPS, PPS, slice header, CTU or CU. For example, the control flag can be in the slice header. In another example, the control flag can be in the CU level. Also, the control flag can be in two different levels.

In another method, when AMT is enabled for the chroma transform blocks in the current control unit, a control flag, emt_cr_sep_flag, can be coded to indicate whether the use of AMT on the individual transform blocks from the two chroma components in the current control unit can be determined and signaled separately from the luma component in the current control unit. When emt_cr_sep_flag is equal to 0 or the chroma transform block size is smaller than a threshold value, the side information on using AMT (also referred as AMT selection information in this disclosure), including the AMT on/off flag and selected AMT Index, for a chroma transform block is derived from that of the related luma transform block from the same transform unit or the same or neighboring picture region. When emt_cr_sep_flag is equal to 1, at least some side information related to using AMT for the chroma transform blocks can be determined and signaled separately from the luma transform blocks. This control flag can be present in the SPS, PPS, slice header, CTU, or CU. For example, the control flag can be in the slice header. In another example, the control flag can be in the CU level. Also, the control flag can be in two different levels.

The signaling of AMT usage can be incorporated in the slice header syntax. For example, the syntax slice_header_amt_cr_enabled_flag can be signaled in the slice header to indicate whether AMT is enabled for the chroma components in the current slice. When slice_header_amt_cr_enabled_flag is false, AMT is not applied to the chroma components in the current slice. When slice_header_amt_cr_enabled_flag is true, the syntax slice_header_amt_cr_sep_flag is further signaled to indicate whether the use of the AMT for the chroma components is controlled separately from the luma component in each CU. When slice_header_amt_cr_enabled_flag is true and slice_header_amt_cr_sep_flag is false, the coded AMT information in each CU is applied to both luma and chroma components.

The signaling of AMT usage can also be incorporated in the CU syntax. For example, when both slice_header_amt_cr_enabled_flag and slice_header_amt_cr_sep_flag are true, the AMT information is respectively signaled for the luma and chroma components in each CU. When the luma cbf (coded block flag) is non-zero, the syntax cu_amt_flag is signaled to indicate whether the AMT is applied to the luma component in the current CU. When cu_amt_flag is true, the video coder further signals the syntax cu_amt_idx to indicate the selected luma transform type in the current CU. When at least one chroma cbf is non-zero, the syntax cu_amt_cr_flag is signaled to indicate whether the AMT is applied to the chroma components in the current CU. When cu_amt_cr_flag is true, the video coder further signals or derives the selected chroma transform type in the current CU.

In yet another method, when AMT is enabled and at least some side information related to using AMT can be separately signaled for the chroma transform blocks, some side information related to using AMT for chroma transform blocks can be predicted or derived from that of the corresponding luma transform block from the same transform unit or the same or neighboring picture region. For example, the chroma TBs can signal the AMT on/off flag separately from the luma TB. The chroma TBs may re-use the AMT transform types selected by the corresponding luma TBs when AMT is signaled to be applied to luma and chroma TBs from the same TU. To save bit cost associated with AMT signaling, some side information associated with using AMT on the chroma transform blocks can be derived from the corresponding luma transform blocks or set to some pre-defined values for transform blocks with block size smaller than a threshold value. Some side information associated with using AMT on the chroma transform blocks can be entropy coded conditioned on the corresponding coded information from the related luma transform blocks. The transform blocks of two chroma components from the same transform unit can be controlled jointly and share the same set of side information.

According to JVET-D1001, for the luma TB, when the luma cbf is non-zero, cu_amt_flag is signaled first and luma_transform_skip_flag is signaled next. According to another method of the present invention, when AMT and the transform skip mode are both available for use for a transform block, the on/off signaling of AMT is coded before the on/off signaling of the transform skip mode. As is known in the field, when the Intra transform skip mode is used, a residual block is directly quantized in the pixel domain without transforming the block into the frequency domain. Intra transform skip mode provides noticeable coding gain for certain type of contents, such as screen content. If the on/off signaling of AMT is already signaled to indicate that AMT is employed for a transform block, then the corresponding on/off signaling of the transform skip mode is not coded and is inferred to be off. When the on/off signaling of AMT is already signaled to indicate that AMT is employed for a transform block, this implies that a transform process is applied to the TB. In other words, the Intra transform skip mode is false. Consequently, the signaling of the Intra transform skip mode is redundant.

FIG. 1 illustrates a flowchart of an exemplary coding system incorporating an embodiment of the present invention, where the use of AMT (adaptive multiple core transform) for the chroma transform blocks (TBs) can be signaled separately from the luma TB in the same control unit. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, input data associated with a current control unit in a current picture are received in step 110, where the current control unit comprises one luma component and two chroma components. One or more luma AMT (adaptive multiple core transform) control flags for a current luma TB (transform block) in the current control unit are determined in step 120. A first transform is then applied to the current luma TB according to luma AMT selection information as indicated by said one or more luma AMT control flags in step 130. One or more first chroma AMT control flags are determined for two current chroma TBs (transform blocks) corresponding to the current luma TB in the current control unit in step 140, where said one or more first chroma AMT control flags indicate whether chroma AMT is enabled for said two current chroma TBs. If said one or more first chroma AMT control flags indicate the chroma AMT being disabled for said two current chroma TBs, applying a fixed-type transform to said two current chroma TBs. A fixed-type transform is applied to said two current chroma TBs if said one or more first chroma AMT control flags indicate the chroma AMT being disabled for said two current chroma TBs in step 150.

Figure 2:
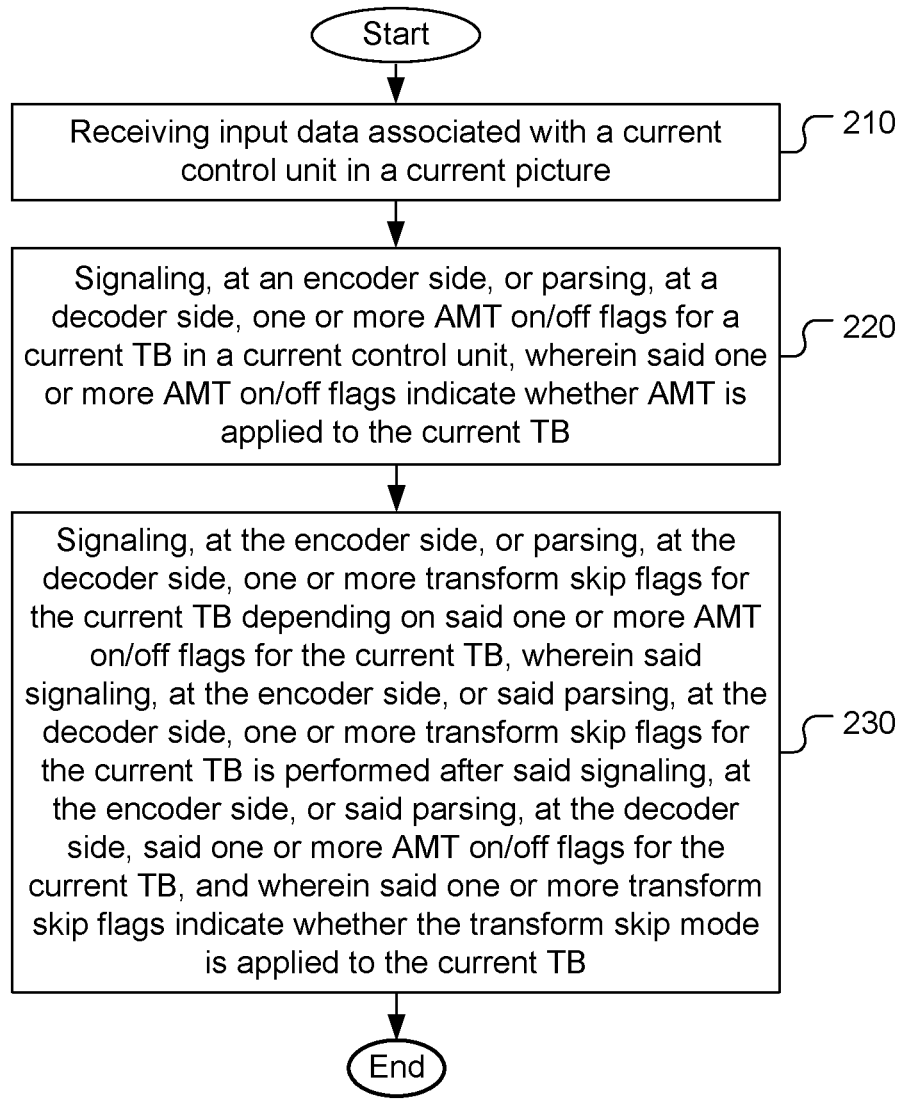
FIG. 2 illustrates a flowchart of an exemplary coding system incorporating an embodiment of the present invention, where when AMT and the transform skip mode are both available for use for a transform block, the on/off signaling of AMT is coded before the on/off signaling of the transform skip mode.

FIG. 2 illustrates a flowchart of an exemplary coding system incorporating an embodiment of the present invention, where when AMT and the transform skip mode are both available for use for a transform block, the on/off signaling of AMT is coded before the on/off signaling of the transform skip mode. Input data associated with a current control unit in a current picture are received in step 210. One or more AMT on/off flags are signaled at an encoder side or parsed at a decoder side for a current TB in a current control unit in step 220, where said one or more AMT on/off flags indicate whether AMT is applied to the current TB. One or more transform skip flags are signaled at the encoder side or parsed at the decoder side for the current TB depending on said one or more AMT on/off flags for the current TB in step 230, where said one or more transform skip flags are signaled at the encoder side or parsed at the decoder side after said one or more AMT on/off flags are signaled at the encoder side or parsed at the decoder side for the current TB, and said one or more transform skip flags indicate whether the transform skip mode is applied to the current TB. In one embodiment, said one or more transform skip flags are not signaled if said one or more AMT on/off flags indicate AMT is applied to the current TB. In another embodiment, if said one or more transform skip flags are not present in a video bitstream, the transform skip mode is not applied to the current TB.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention. Embodiment of the present invention as described above may be implemented in a video encoder and a video decoder. The components of the video encoder and video decoder may be implemented by hardware components, one or more processors configured to execute program instructions stored in a memory, or a combination of hardware and processor. For example, a processor executes program instructions to control receiving of input data associated with a video sequence including a current block in a current picture. The processor is equipped with a single or multiple processing cores. In some examples, the processor executes program instructions to perform functions in some components in the encoder and the decoder, and the memory electrically coupled with the processor is used to store the program instructions, information corresponding to the reconstructed images of blocks, and/or intermediate data during the encoding or decoding process. The memory in some embodiment includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable medium listed above.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding used by a video coding system, the method comprising:
   receiving input data associated with a current control unit in a current picture, wherein the current control unit comprises one luma component and two chroma components;
   determining one or more luma AMT (adaptive multiple core transform) control flags for a current luma TB (transform block) in the current control unit;
   applying a first transform to the current luma TB according to luma AMT selection information as indicated by said one or more luma AMT control flags;
   determining one or more first chroma AMT control flags for two current chroma TBs (transform blocks) corresponding to the current luma TB in the current control unit, wherein said one or more first chroma AMT control flags indicate whether chroma AMT is enabled for said two current chroma TBs;
   applying a fixed-type transform to said two current chroma TBs if said one or more first chroma AMT control flags indicate the chroma AMT being disabled for said two current chroma TBs; and
   determining one or more second chroma AMT control flags for said two current chroma TBs if said one or more first chroma AMT control flags indicate the chroma AMT being enabled for said two current chroma TBs, wherein said one or more second chroma AMT control flags indicate whether said applying the chroma AMT to said two current chroma TBs uses separate chroma AMT selection information or share the luma AMT selection information with the current luma TB.

2. The method of video coding in claim 1, further comprising determining a chroma AMT on/off flag to indicate whether the chroma AMT is applied to said two current chroma TBs if said one or more first chroma AMT control flags indicate the chroma AMT being enabled for said two current chroma TBs.

3. The method of video coding in claim 2, further comprising applying the chroma AMT to said two current chroma TBs using at least a part of the luma AMT selection information if the chroma AMT on/off flag indicates that the chroma AMT is applied to said two current chroma TBs.

4. The method of video coding in claim 2, further comprising applying the chroma AMT to said two current chroma TBs using at least a part of pre-defined chroma AMT selection information if the chroma AMT on/off flag indicates that the chroma AMT is applied to said two current chroma TBs and block size of said two current chroma TBs is smaller than a threshold value.

5. The method of video coding in claim 1, wherein said one or more first chroma AMT control flags are located in SPS (sequence flag set), PPS (picture flag set), slice header, CTU (coding tree unit), CU (coding unit) or a combination thereof of a video bitstream.

6. The method of video coding in claim 1, further comprising determining at least a part of said separate chroma AMT selection information if said one or more second chroma AMT control flags indicate that said applying the chroma AMT to said two current chroma TBs uses separate chroma AMT selection information.

7. The method of video coding in claim 6, said at least a part of said separate chroma AMT selection information is predicted or derived from said luma AMT selection information associated with the current luma TB in the current picture or a neighboring picture.

8. The method of video coding in claim 1, wherein said one or more second chroma AMT control flags are located in SPS (sequence flag set), PPS (picture flag set), slice header, CTU (coding tree unit), CU (coding unit) or a combination thereof of a video bitstream.

9. An apparatus of video coding used by a video coding system, the apparatus comprising one or more processors configured to:
receive input data associated with a current control unit in a current picture, wherein the current control unit comprises one luma component and two chroma components;
determine one or more luma AMT (adaptive multiple core transform) control flags for a current luma TB (transform block) in the current control unit;
apply a first transform to the current luma TB according to luma AMT selection information as indicated by said one or more luma AMT control flags;
determine one or more first chroma AMT control flags for two current chroma TBs (transform blocks) corresponding to the current luma TB in the current control unit, wherein said one or more first chroma AMT control flags indicate whether chroma AMT is enabled for said two current chroma TBs;
apply a fixed-type transform to said two current chroma TBs if said one or more first chroma AMT control flags indicate the chroma AMT being disabled for said two current chroma TBs; and
determine one or more second chroma AMT control flags for said two current chroma TBs if said one or more first chroma AMT control flags indicate the chroma AMT being enabled for said two current chroma TBs, wherein said one or more second chroma AMT control flags indicate whether said applying the chroma AMT to said two current chroma TBs uses separate chroma AMT selection information or share the luma AMT selection information with the current luma TB.

10. A non-transitory computer readable medium storing program instructions causing a processor of an apparatus to perform a video coding method, and the method comprising:
receiving input data associated with a current control unit in a current picture, wherein the current control unit comprises one luma component and two chroma components;
determining one or more luma AMT (adaptive multiple core transform) control flags for a current luma TB (transform block) in the current control unit;
applying a first transform to the current luma TB according to luma AMT selection information as indicated by said one or more luma AMT control flags;
determining one or more first chroma AMT control flags for two current chroma TBs (transform blocks) corresponding to the current luma TB in the current control unit, wherein said one or more first chroma AMT control flags indicate whether chroma AMT is enabled for said two current chroma TBs;
applying a fixed-type transform to said two current chroma TBs if said one or more first chroma AMT control flags indicate the chroma AMT being disabled for said two current chroma TBs; and
determining one or more second chroma AMT control flags for said two current chroma TBs if said one or more first chroma AMT control flags indicate the chroma AMT being enabled for said two current chroma TBs, wherein said one or more second chroma AMT control flags indicate whether said applying the chroma AMT to said two current chroma TBs uses separate chroma AMT selection information or share the luma AMT selection information with the current luma TB.

11. The apparatus of claim 9, wherein the one or more processors are further configured to determine a chroma AMT on/off flag to indicate whether the chroma AMT is applied to said two current chroma TBs if said one or more first chroma AMT control flags indicate the chroma AMT being enabled for said two current chroma TBs.

12. The apparatus of claim 11, wherein the one or more processors are further configured to apply the chroma AMT to said two current chroma TBs using at least a part of the luma AMT selection information if the chroma AMT on/off flag indicates that the chroma AMT is applied to said two current chroma TBs.

13. The apparatus of claim 11, wherein the one or more processors are further configured to apply the chroma AMT to said two current chroma TBs using at least a part of pre-defined chroma AMT selection information if the chroma AMT on/off flag indicates that the chroma AMT is applied to said two current chroma TBs and block size of said two current chroma TBs is smaller than a threshold value.

14. The apparatus of claim 9, wherein said one or more first chroma AMT control flags are located in SPS (sequence flag set), PPS (picture flag set), slice header, CTU (coding tree unit), CU (coding unit) or a combination thereof of a video bitstream.

15. The apparatus of claim 9, wherein the one or more processors are further configured to determine at least a part of said separate chroma AMT selection information if said one or more second chroma AMT control flags indicate that said applying the chroma AMT to said two current chroma TBs uses separate chroma AMT selection information.

16. The apparatus of claim 15, wherein the one or more processors are further configured to predict or derive said at least a part of said separate chroma AMT selection information from said luma AMT selection information associated with the current luma TB in the current picture or a neighboring picture.

17. The apparatus of claim 9, wherein said one or more second chroma AMT control flags are located in SPS (sequence flag set), PPS (picture flag set), slice header, CTU (coding tree unit), CU (coding unit) or a combination thereof of a video bitstream.

* * * * *